United States Patent
Berktold et al.

(10) Patent No.: US 6,409,442 B1
(45) Date of Patent: Jun. 25, 2002

(54) VERTICAL INTERNAL PUSH BROACHING MACHINE

(75) Inventors: Andreas Berktold, Neuss; Thomas Grigutsch, Solingen, both of (DE)

(73) Assignee: Oswald Forst Maschinenfabrik und Apparatebauanstalt GmbH & Co. KG, Solingen (DE)

( * ) Notice: Subject to any disclaimer, the term of this patent is extended or adjusted under 35 U.S.C. 154(b) by 3 days.

(21) Appl. No.: 09/655,308

(22) Filed: Sep. 5, 2000

(30) Foreign Application Priority Data

Sep. 4, 1999 (DE) .......................................... 199 42 163

(51) Int. Cl.⁷ .............................................. B23D 37/10
(52) U.S. Cl. ........................ 409/269; 409/275; 409/285; 409/286; 409/287
(58) Field of Search ................................ 409/264, 266, 409/269, 275, 286, 287, 282, 285

(56) References Cited

U.S. PATENT DOCUMENTS

| | | | | |
|---|---|---|---|---|
| 1,901,500 A | * | 3/1933 | Ferris | 409/275 |
| 2,135,157 A | * | 11/1938 | West | 409/267 |
| 2,315,476 A | * | 3/1943 | Groene | 409/275 |
| 2,529,705 A | * | 11/1950 | Pataki et al. | 409/267 |
| 3,103,852 A | * | 9/1963 | Bonnafe | 409/285 |
| 5,755,539 A | * | 5/1998 | Takeuchi et al. | 409/275 |
| 5,833,411 A | | 11/1998 | Holstein et al. | |

* cited by examiner

Primary Examiner—Daniel W. Howell
(74) Attorney, Agent, or Firm—Browdy and Neimark

(57) ABSTRACT

A vertical internal push broaching machine comprises a machine column and a workpiece lifting table which is guided for displacement on carriage guideways. Underneath the lifting table, a feeder carriage is disposed vertically displaceably on guideways. These guideways can be separate from the carriage guideways. The lifting table is actuated by means of a single elevating drive which is disposed behind the plane spanned by the carriage guideways.

16 Claims, 6 Drawing Sheets

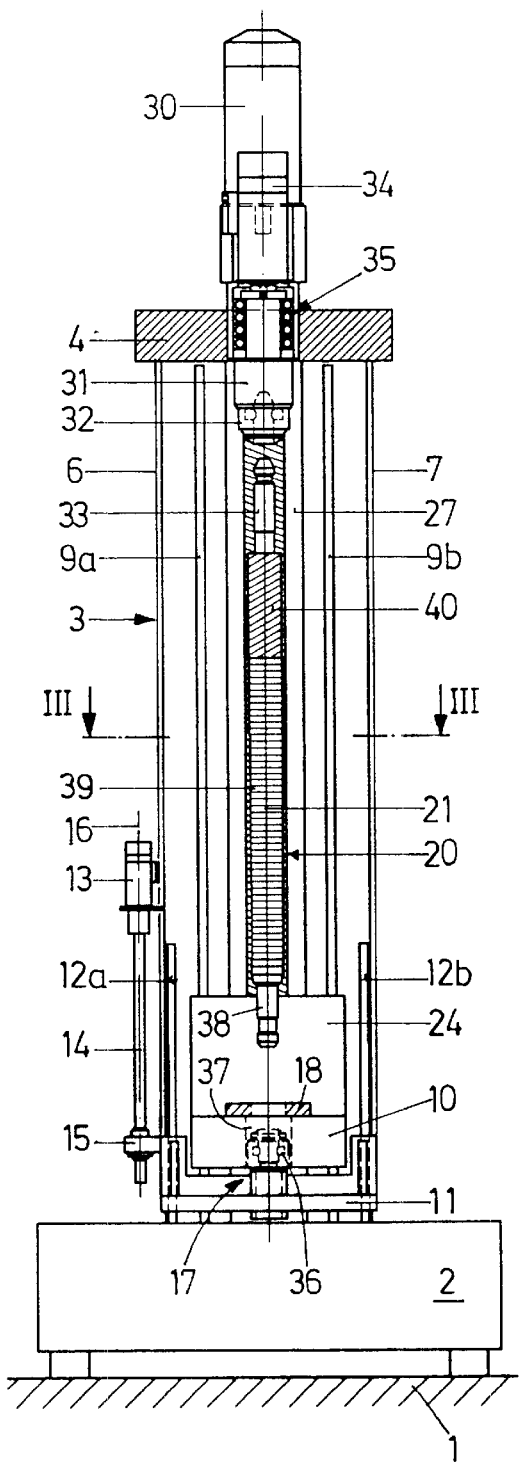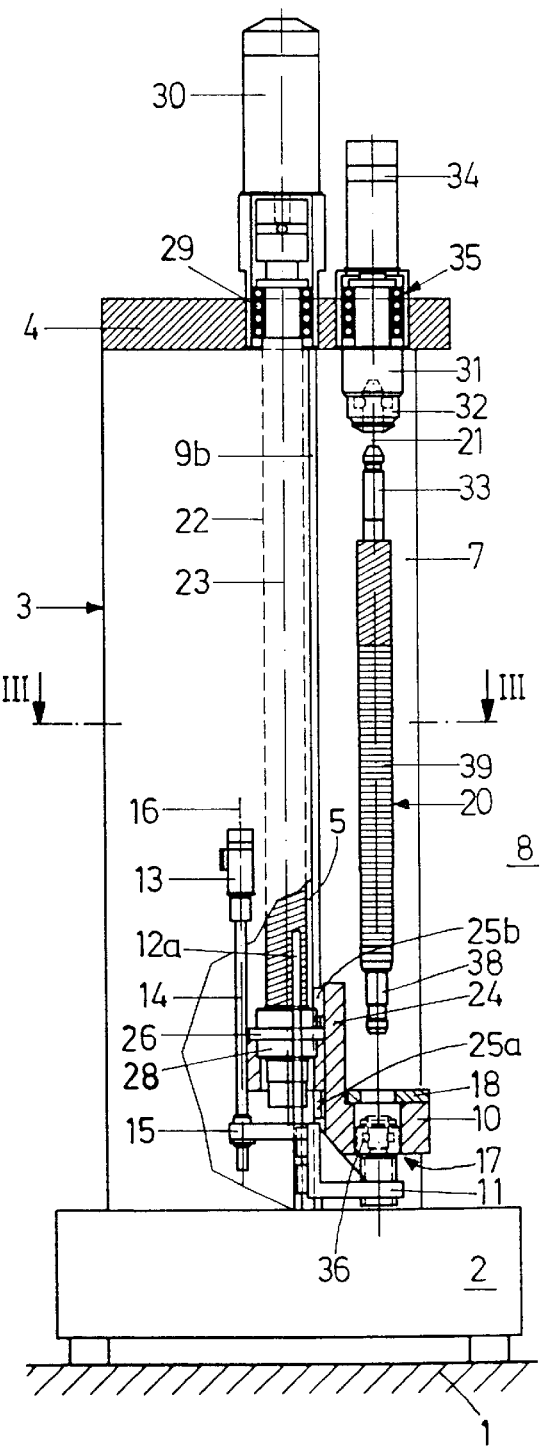

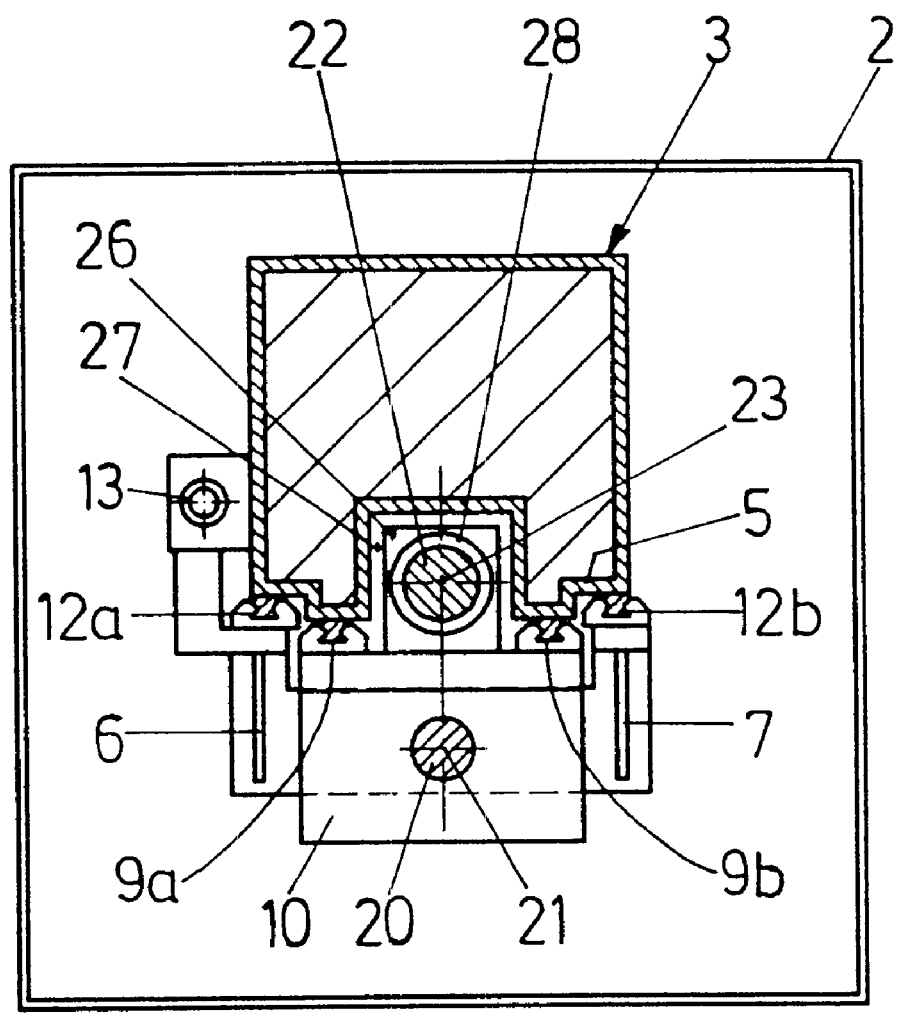

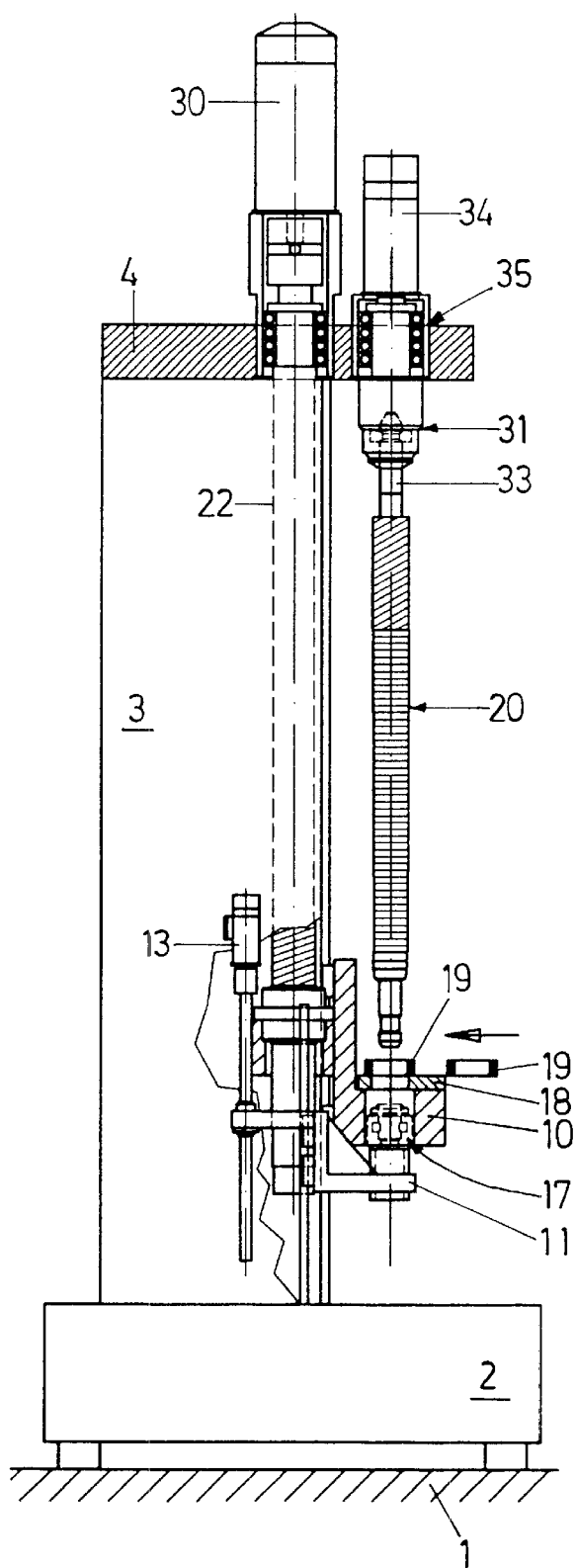
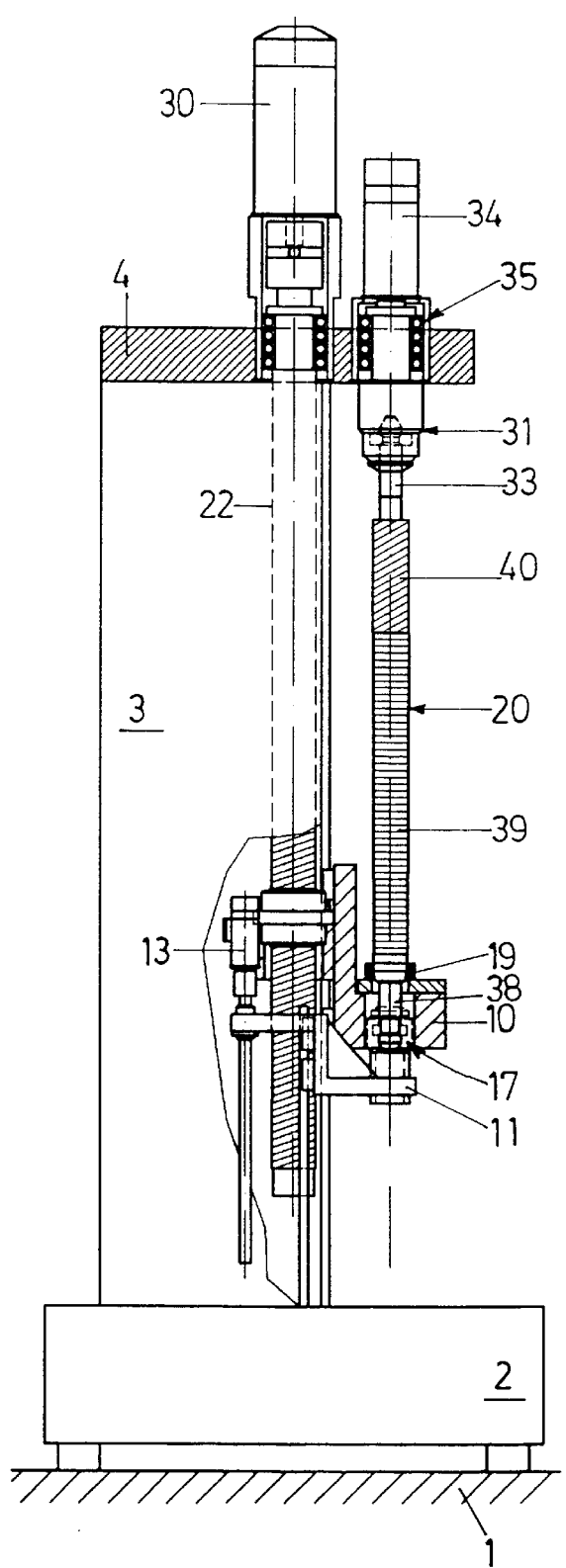

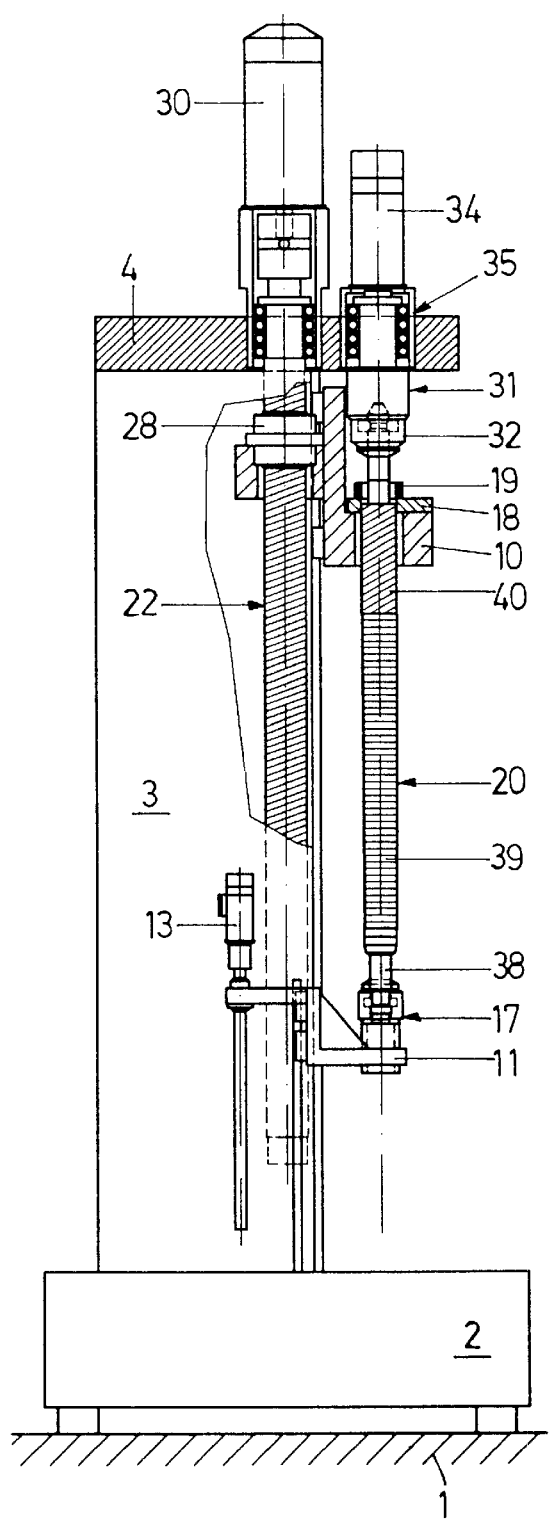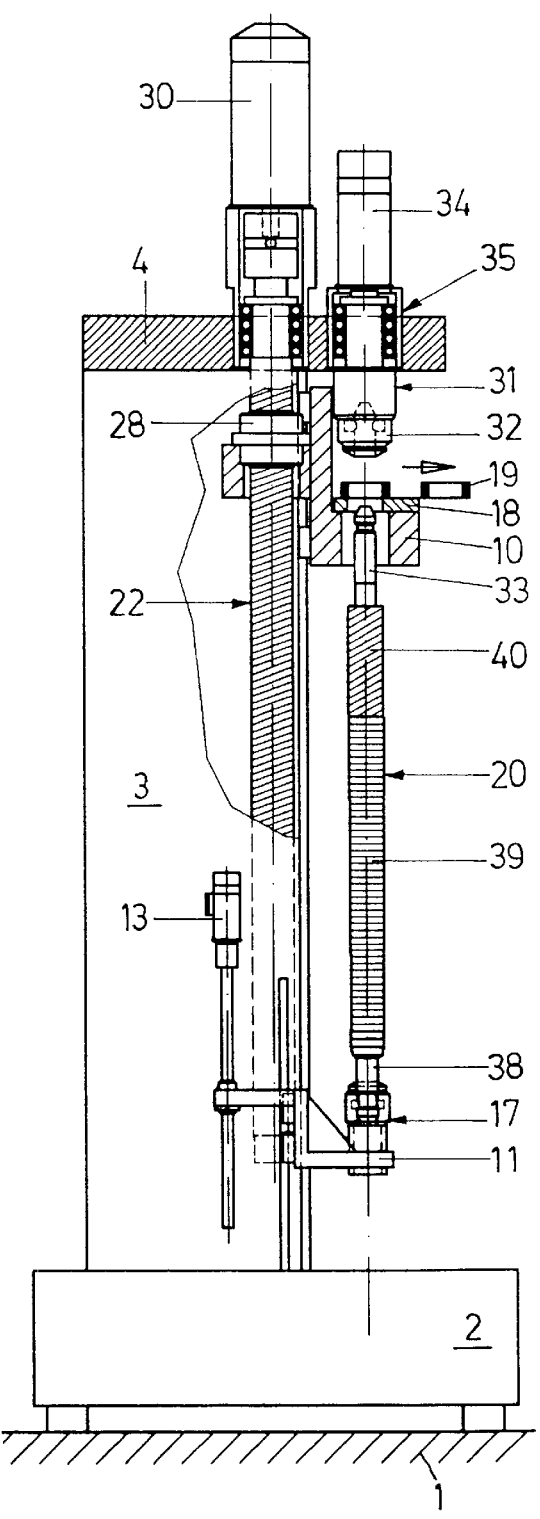

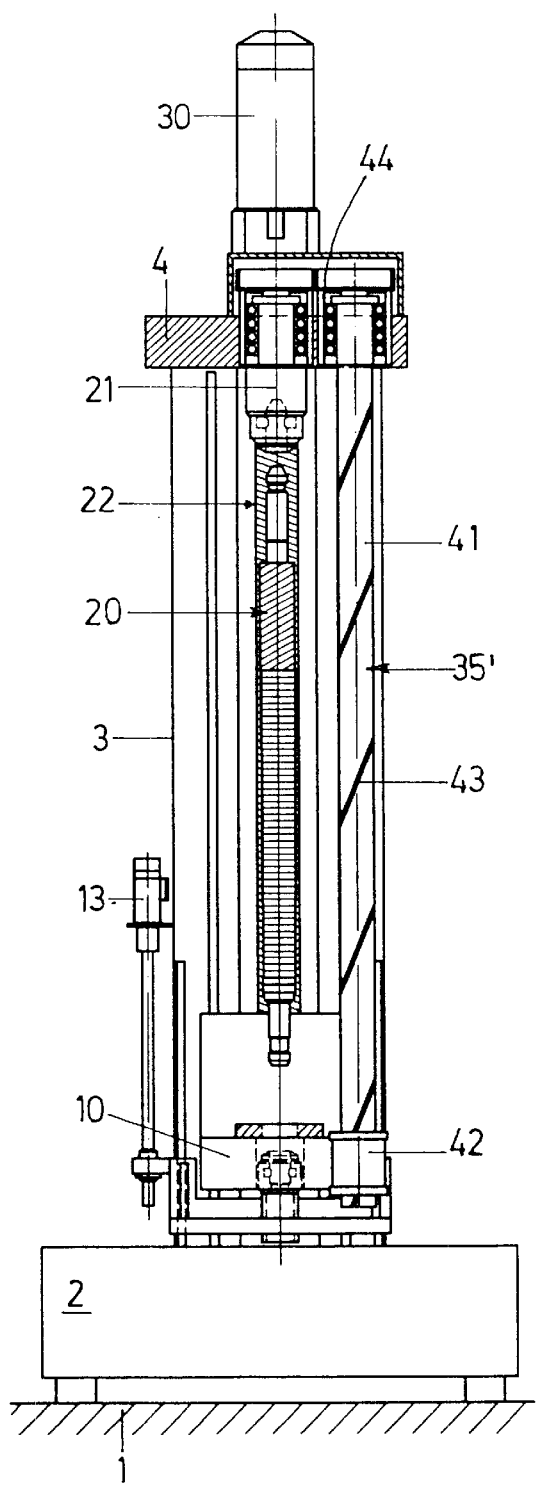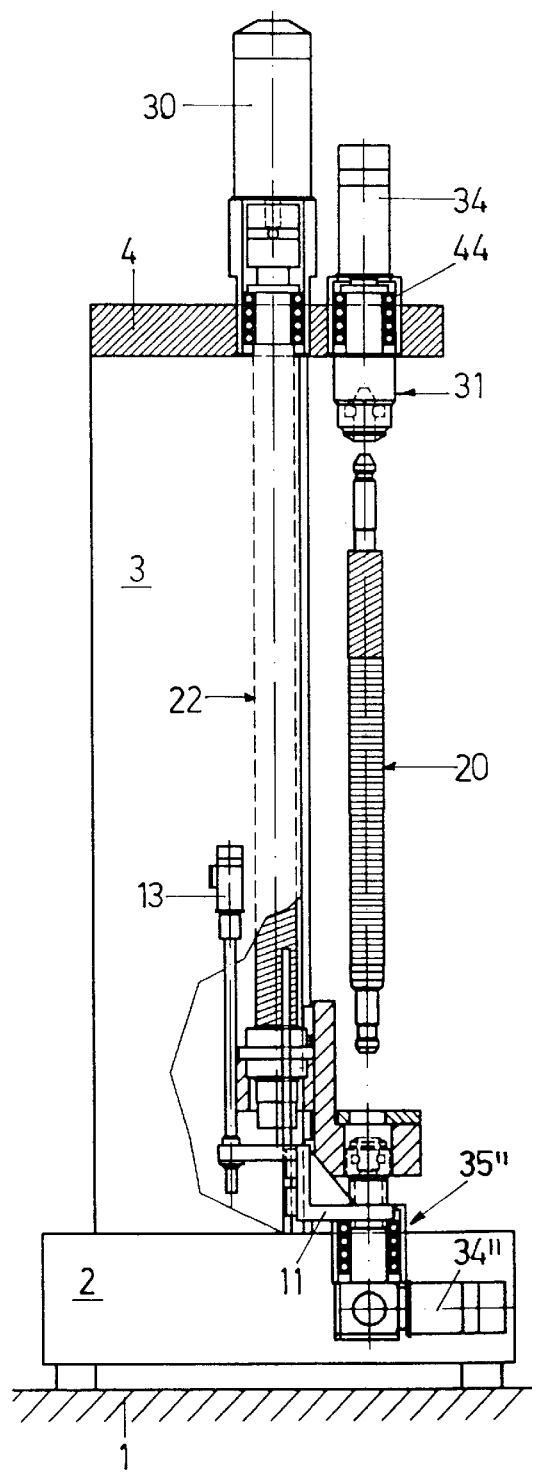

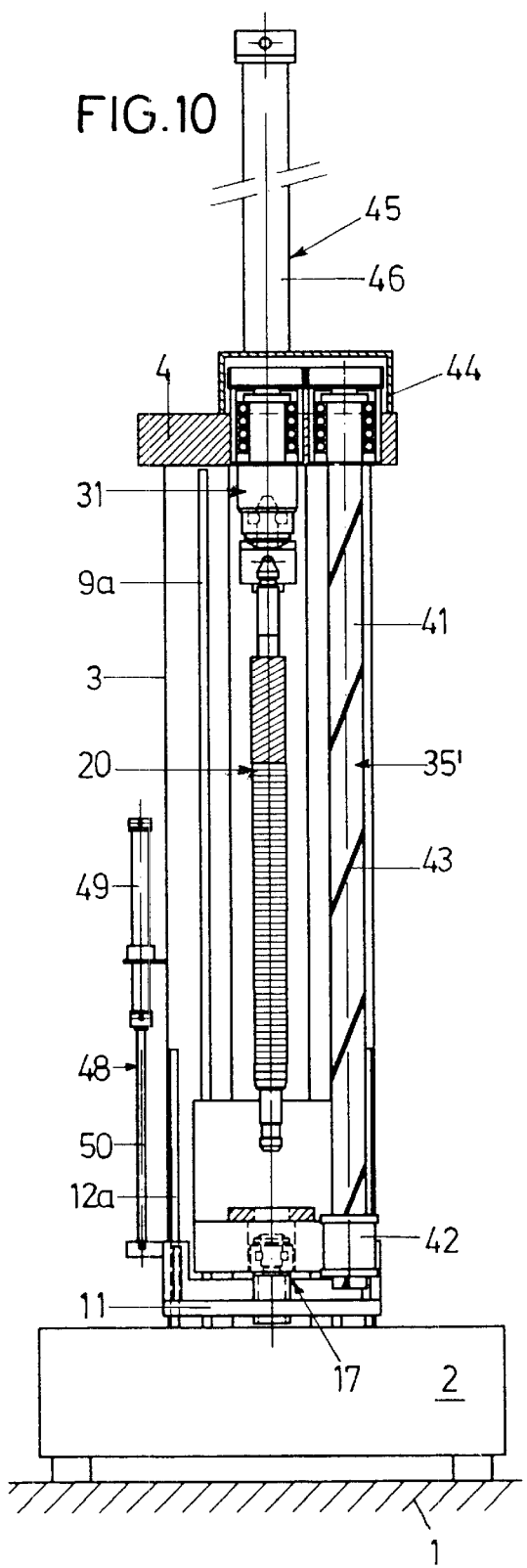
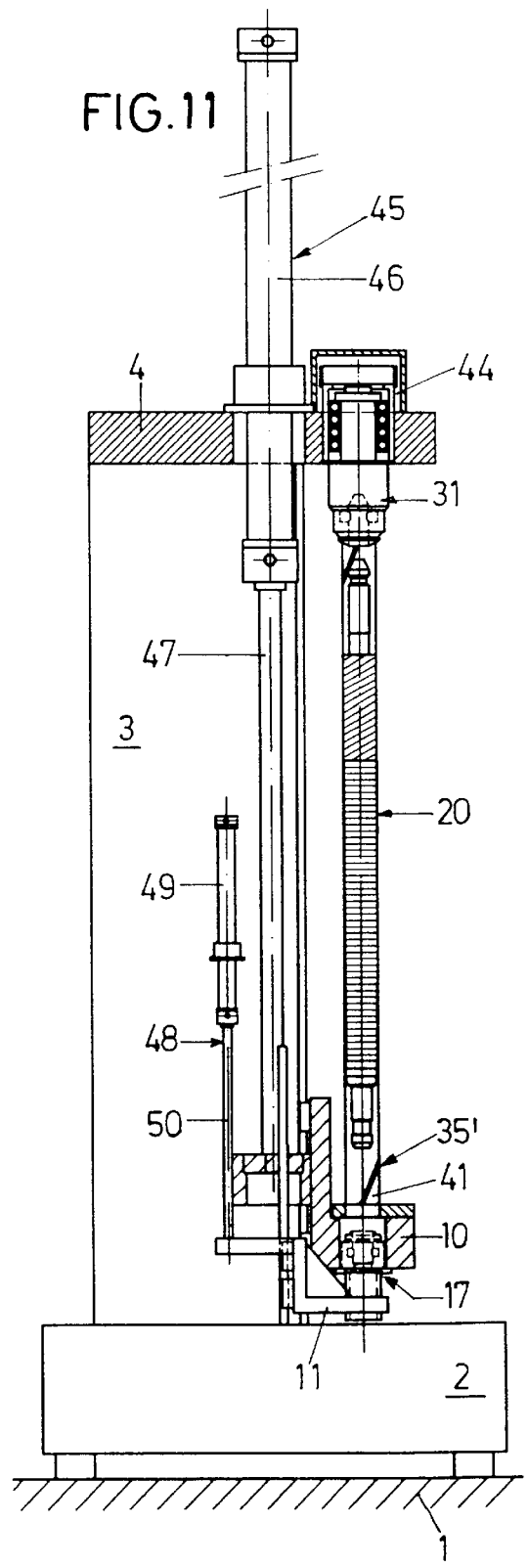

VERTICAL INTERNAL PUSH BROACHING MACHINE

BACKGROUND OF THE INVENTION

1. Field of the Invention

The invention relates to a vertical internal push broaching machine comprising a machine column having an upper rail and a back wall; carriage guideways mounted on the back wall and disposed in a common vertical plane; a workpiece lifting table displaceably guided on the carriage guide-ways in front of the back wall; a feeder carriage guided for vertical displacement and disposed underneath the lifting table; a lifting table drive connecting the machine column and the lifting table; at least one upper broach holder mounted on the rail; at least one workpiece seat disposed on the lifting table for the accommodation of a workpiece which is to be broached; and at least one lower workpiece holder mounted on the feeder carriage, a workpiece seat and an upper broach holder and a lower broach holder at a time being disposed coaxially of the central longitudinal axis of a broach.

2. Background Art

A broaching machine of the generic type known from U.S. Pat. No. 5,833,411 comprises two elevating spindles which connect the rail and the lifting table and are disposed by their central longitudinal axes in a common plane, the axis of the at least one broach also being disposed in this plane, namely between the two elevating spindles. As a result of this design, the machine column itself is free from forces because the entire broaching forces remain within the system consisting of the lifting table, rail, elevating spindles and broach.

SUMMARY OF THE INVENTION

It is an object of the invention to embody the broaching machine of the generic type such that it has a constructionally less complicated design.

According to the invention, this object is attained by the lifting table drive being formed by a single elevating drive which is disposed behind the plane spanned by the carriage guideways. The measures according to the invention help avoid problems that may reside in the existence of two elevating drives. These problems consist in the synchronization of two driving motors for two elevating spindles, and the difference in heating and thus in thermal expansion of the elevating spindles, or the synchronization of two hydraulically actuated piston-cylinder drives. Further, problems of guidance of the lifting table, which may occur in the case of a guidance, free from play, of the lifting table and in the case of actuation by two elevating drives, are avoided by over-determination of the guidance. Furthermore, a design is obtained which is narrower than in the known embodiment. Avoiding the mentioned drawbacks also results in a reduction of cost.

An advantageous embodiment which is independently inventive resides in that the twist motor comprises a geared motor which is allocated to the feeder carriage and coupled with the lower broach holder.

Further features, advantages and details of the invention will become apparent from the ensuing description of exemplary embodiments, taken in conjunction with the drawing.

BRIEF DESCRIPTION OF THE DRAWING

FIG. 1 is an elevation of a vertical internal push broaching machine without a broach being spatially allocated;

FIG. 2 is a lateral view, partly broken away, of a broaching machine according to FIG. 1;

FIG. 3 is a horizontal section through the broaching machine according to FIGS. 1 and 2 on the line III—III in FIGS. 1 and 2;

FIG. 4 is a lateral view of the broaching machine prior to the beginning of a broaching stroke when a workpiece is loaded which is to be broached;

FIG. 5 is a lateral view of the broaching machine at the beginning of a broaching stroke;

FIG. 6 is a lateral view of the broaching machine at the end of the broaching stroke;

FIG. 7 is a lateral view of the broaching machine after termination of the broaching stroke when the broached workpiece is removed;

FIG. 8 is an elevation of the broaching machine with a twist drive modified as compared to FIG. 1;

FIG. 9 is a lateral view of the broaching machine with a twist drive modified as compared to FIG. 1 and FIG. 8;

FIG. 10 is an elevation of the broaching machine with an elevating drive modified as compared to FIGS. 1 to 9; and FIG. 11 is a lateral view, partly broken away, of the broaching machine according to FIG. 10.

DESCRIPTION OF THE PREFERRED EMBODIMENTS

As seen in FIGS. 1 and 2, a vertical internal push broaching machine according to the invention comprises a base 2 which is supported on a foundation 1 and constitutes part of a machine column 3. The machine column 3 is finished upwards by a rail 4 and, between the base 2 and the rail 4, comprises a back wall 5 and side walls 6, 7 which have the shape of a C according to the cross-sectional illustration of FIG. 3 and which combine with the base 2 and the rail 4 to render the machine column 3 very stable as a whole.

On the front of the back wall 5 that is turned towards the loading side 8 of the broaching machine carriage guideways 9a, 9b are provided, on which a workpiece lifting table 10 is guided for vertical displacement, serving as a broach tool slide.

Underneath the lifting table 10, a feeder carriage 11 is disposed on guideways 12a, 12b, which are separate from the carriage guideways 9a, 9b, for vertical displacement by means of a feeder carriage drive which is mounted by the side and at the bottom of the machine column 3 so that it cannot collide with the elevating drive, regardless of whether the elevating drive is disposed above or below the lifting table 10. The feeder carriage 11 may also be disposed for displacement on the guideways 9a, 9b —as known from U.S. Pat. No. 5,833,411. The drive comprises a feeder carriage driving motor 13 which actuates a vertically mounted feeder spindle 14. Disposed on this spindle 14 is a spindle nut 15 which is tightly united with the feeder carriage 11 so that, upon rotation of the spindle 14 about its axis 16, the feeder carnage 11 is displaced vertically. A lower broach holder 17 is mounted on the feeder carriage 11.

The lifting table 10 comprises a workpiece seat 18 for the reception of a workpiece 19 to be broached by means of an internal broach 20. An elevating spindle 22 in the form of a roller-type screw drive is disposed as the only lifting table elevating drive behind the carriage guideways 9, i.e. behind the back wall 5 as seen from the loading side 8. The central longitudinal axis 23 of the spindle 22 and the axis 21 of the broach 20 lie in a common vertical plane which is perpendicular to, and centrally intersects, the vertical plane spanned by the carriage guideways 9a, 9b.

The lifting table 10 comprises a back wall 24 of the type of a carriage, on which guide bearings 25a, 25b are mounted, which are displaceably guided vertically one above the other on the carriage guideways 9a, 9b. Mounted on the back wall 24 is an arm 26 which projects backwards away from the loading side 8 into a recess 27 in the shape of a box in the back wall 5, the elevating spindle 22 being disposed in this recess 27. A spindle nut 28 is mounted on the arm 26, taking up the elevating spindle 22. The elevating spindle 22 lodges freely rotatably, but axially non-displaceably, in a bearing 29 in the rail 4. It is operated by means of a motor-driven spindle drive 30 as an elevating drive which is also disposed on the rail 4.

Coaxially of the axis 21 of the broach 20, an upper broach holder 31 is mounted on the rail 4, comprising a retriever 32 for the tail piece 33 of the broach 20. In this embodiment, the upper broach holder 31 is rotatable in order to be able to carry out a twist broaching operation by means of the broach 20 in the form of a twist broach. To this end, in the exemplary embodiment under regard, the upper broach holder 31 is drivable by means of a twist motor 35 substantially formed by a geared motor 34. The lower broach holder 17 is freely rotatable about the axis 21. The lower broach holder 17 comprises a puller 36, which can be moved into a recess 37 formed underneath the workpiece seat 18 on the lifting table 10 and which serves for receiving and holding the pull end 38 of the broach 20.

All the driving motors 13, 30, 34 are controlled by means of a CNC control (not shown).

In the following, the mode of operation of the broaching machine described hereinabove is explained, taken in conjunction with FIGS. 4 to 7.

In the illustration according to FIG. 4, the lifting table 10 is in its lower position. The feeder carriage 11 is in a central position, in which the puller 36 is in the recess 37 under the workpiece seat 18. The broach 20 is held by its tail piece 33 in the upper broach holder 31. A workpiece 19, which is to be broached, is placed in the seat 18. This lower position of the lifting table 10 corresponds to the loading position.

Before the start of the broaching stroke, the lifting table 10 and the feeder carriage 11 are moved upwards simultaneously—corresponding to FIG. 5—until the pull end 38 of the broach 20 is taken up and held in the puller 36 of the lower broach holder 17. The feeder carriage 11 remains in this upper position, whereas the actual broaching stroke starts by corresponding actuation of the elevating spindle 22, first the broaching section 39, adjoining 10 in the pull end 38, and then the sizing section 40, adjoining the tail piece 33, of the broach 20 being pushed through the workpiece 19, the broach 20 being simultaneously rotated about its axis 21, corresponding to the twist to be produced. Consequently, push broaching takes place, in which the elevating spindle 22 is subject to tensile stress and the broach 20 is subject to compressive stress. The carriage guideways 9a, 9b and correspondingly the guide bearings 25a, 25b and the lifting table 10 must absorb the tilting moments which occur about a horizontal axis in the plane of the carriage guideways 9a, 9b. By reason of the specified conditions of symmetry, no tilting moments occur around a horizontal axis which lies in the plane common to the axes 21 and 23.

At the end of the broaching stroke, when the sizing section 40 is completely pushed through the workpiece 19, the lifting table 10 possesses its smallest possible distance from the rail 4 as seen in FIG. 6. The retriever 32 is opened and the feeder carriage driving motor 13 is triggered such that the feeder carriage 11, inclusive of the broach 20 held by the lower broach holder 17, is displaced downwards into the lower position, seen in FIG. 7, of the feeder carriage 11. In this position, also the tail piece 33 of the broach 20 is extended downwards out of the workpiece 19 which is now removed from the seat 18. An ejection device, which is general practice, is not shown. Then the feeder carriage 11 is again moved into its upper position so that the upper workpiece holder 31 may again take over the broach 20. Then the lifting table 10 is moved into its lower position and the feeder carriage 11 is also moved into its central position as seen in FIG. 4. The pull end 38 of the broach 20 is now sufficiently far above the seat 18 for another workpiece 19 that is to be broached to be placed therein. The broaching job is then repeated.

This broaching machine may also have several broaching fixtures, i.e. several broaches 20, which are disposed in mirror symmetry relative to a vertical plane, which is perpendicular to the plane formed by the guideways 9a, 9b and placed centrally therethrough, and which accommodates the axis 23 of the elevating spindle 22. In this case, too, the freedom from tilting moments about a plane perpendicular to the plane defined by the guideways 9a, 9b is maintained.

The embodiment according to FIG. 8 differs from the embodiment according to FIGS. 1 to 7 only in that the twist motor 35' comprises a so-called twist bar 41. This twist bar 41 is disposed in parallel to the axis 21 of the broach 20 for rotation in the rail 4 and in the lifting table 10; it is held in the lifting table 10 in a twist nut 42 which is mounted non-rotatably on the lifting table 10. Upon displacements of the lifting table 10, the twist bar 41 is rotated. It has a thread 43 which is designed in accordance with the desired twist motion of the broach 20. Transmitting the rotary motion of the twist bar 41 to the upper broach holder 31 takes place by means of a pinion gear 44. It is also possible to join the twist bar 41 non-rotatably to the lifting table 10 and to mount the twist nut 42 rotatably on the rail 4 in such a way that it confers its rotary motion directly to the pinion gear 44. Otherwise, the functioning of this broaching machine according to FIG. 8 is identical with the broaching machine described in connection with FIGS. 1 to 7. With this embodiment, tilting moments about a horizontal axis occur on the lifting table 10, which extend perpendicularly on the plane formed by the carriage guideways 9a, 9b, because the twist bar 41 is disposed outside the plane formed by the axes 21 and 23. This embodiment which comprises only one twist bar 41 can also be applied to a design of the broaching machine with two or possibly four broaching fixtures, i.e. two or four broaches. In this case, the twist bar 41 is placed in the vertical plane which passes perpendicularly and centrally through the plane formed by the guideways 9a, 9b and which accommodates the axis 23 of the spindle 22. Otherwise, the arrangement of the broaches is the same as described above, namely in mirror symmetry relative to the plane that accommodates the axis 23 and the twist bar 41. In this case, too, no tilting moments about a horizontal axis which is perpendicular to the plane spanned by the guideways 9a, 9b occur on the lifting table 10.

The embodiment according to FIG. 9 differs from the embodiment according to FIGS. 1 to 7 in that the lower broach holder 17 is rotatably drivable. To this end, a geared motor 34" is mounted as a twist motor 35" on the underside of the feeder carriage 11; it is likewise triggered by a CNC control. In this embodiment, the geared motor 34 and the geared motor 34" can be driven simultaneously synchronously, as a result of which very distinct reduction of the torsional moment that occurs in the broach 20 is attained.

But it is also possible only to employ the lower twist motor 35" and to embody the upper broach holder 31 freely rotatably. The embodiment according to FIGS. 10 and 11 differs from all the embodiments so far described in that a hydraulically actuated piston-cylinder drive 45 is provided as a lifting table elevating drive, the cylinder 46 of which is mounted on the rail 4. Its piston rod 47 is joined to the arm 26 of the lifting table 10. The spatial arrangement is the same as with the elevating spindle 22. In this embodiment, further provision is made for a feeder carriage drive which is also a hydraulically actuated piston-cylinder drive 48. The cylinder 49 is mounted on the machine column 3, whereas the piston rod 50 is fixed on the feeder carriage 11.

The same twist motor 35' is provided in this embodiment as in the embodiment according to FIG. 8.

What is claimed is:

1. A vertical internal push broaching machine, comprising
   a machine column (3) having
      an upper rail (4) and
      a back wall (5);
   carriage guideways (9a, 9b) mounted on the back wall (5) and disposed in a common vertical plane;
   a workpiece lifting table (10) displaceably guided on the carriage guideways (9a, 9b) in front of the back wall (5);
   a feeder carriage (11) guided for vertical displacement and disposed underneath the lifting table (10);
   a lifting table drive connecting the machine column (3) and the lifting table (10);
   at least one upper broach holder (31) mounted on the rail (4);
   at least one broach seat (18) disposed on the lifting table (10) for the accommodation of a workpiece (19) which is to broached; and
   at least one lower workpiece holder (17) mounted on the feeder carriage (11),
   a workpiece seat (18) and an upper broach holder (31) and a lower broach holder (17) at a time being disposed coaxially of the central longitudinal axis (21) of a broach (18);
   wherein the lifting table drive is formed by a single elevating drive which is disposed behind a plane spanned by the carriage guideways (9a, 9b); and
   wherein the elevating drive connects the rail (4) and the lifting table (10).

2. A vertical internal push broaching machine according to claim 1, wherein a feeder carriage drive is disposed by a side of the machine column (3) in the lower portion thereof.

3. A vertical internal push broaching machine according to claim 1, wherein the elevating drive is disposed underneath the lifting table (10).

4. A vertical internal push broaching machine according to claim 1, wherein the elevating drive is disposed in a vertical plane which vertically and centrally intersects the plane spanned by the carriage guideways (9a, 9b).

5. A vertical internal push broaching machine according to claim 1, wherein the lifting table (10) is provided with an arm (26) which is joined to the elevating drive and projects behind the plane spanned by the carriage guideways (9a, 9b).

6. A vertical internal push broaching machine according to claim 1, wherein the elevating drive is disposed in a vertically extending recess (27) of the back wall (5).

7. A vertical internal push broaching machine according to claim 1, wherein the elevating drive is an elevating spindle (22) which a single spindle drive (30) is allocated to.

8. A vertical internal push broaching machine according to claim 7, wherein the elevating spindle (22) is mounted rotatably in the rail (4) and accommodated in a spindle nut (28) which is non-rotatably joined to the lifting table (10).

9. A vertical internal push broaching machine according to claim 8, wherein the lifting table (10) is provided with an arm (26) which is joined to the elevating drive and projects behind the plane spanned by the carriage guideways (9a, 9b) and wherein the arm (26) supports the spindle nut (28).

10. A vertical internal push broaching machine according to claim 7, wherein the elevating spindle (22) is a roller-type screw drive.

11. A vertical internal push broaching machine according to claim 1, wherein the lifting table drive is a piston-cylinder drive (48).

12. A vertical internal push broaching machine according to claim 1, wherein at least one broach holder (31, 17) is rotatably drivable by a twist motor (35, 35', 35") for the production of a twist broaching operation.

13. A vertical internal push broaching machine according to claim 12, wherein the twist motor (35') comprises a twist bar (41) which is parallel to the broach (20), held on the lifting table (10) and accommodated in a twist nut (42), the twist bar (41) or the twist nut (42) being in rotary connection with the upper broach holder (31).

14. A vertical internal push broaching machine according to claim 12, wherein the twist motor (35) comprises a geared motor (34) which is allocated to the rail (4) and coupled with the upper broach holder (31).

15. A vertical internal push broaching machine according to claim 12, wherein the twist motor (35") comprises a geared motor (34") which is allocated to the feeder carriage (11) and coupled with the lower broach holder (17).

16. A vertical internal push broaching machine according to claim 1, wherein the feeder carriage (11) is displaceably guided on guideways (12a, 12b) which are separate from the carriage guideways (9a, 9b) and are offset laterally outwards relative thereto.

* * * * *